United States Patent [19]

Gauriat et al.

[11] 4,107,468
[45] Aug. 15, 1978

[54] DIGITAL TRAIN PROCESSING DEVICE

[75] Inventors: Gilles Gauriat, Paris; Jacques Vernezy, Viroflay; Jean-Claude Barigot, Brie Comte Robert, all of France

[73] Assignee: Compagnie Industrielle des Telecommunications Cit-Alcatel S.A., Paris, France

[21] Appl. No.: 732,440

[22] Filed: Oct. 14, 1976

[30] Foreign Application Priority Data

Oct. 20, 1975 [FR] France .................................. 75 32057

[51] Int. Cl.² .................................................. H04J 3/12
[52] U.S. Cl. ................................ 179/15 BY; 179/15 BS
[58] Field of Search ............ 179/15 BY, 15 A, 15 AL, 179/15 BV, 15 BS

[56] References Cited

U.S. PATENT DOCUMENTS

| 3,886,317 | 5/1975 | Drapkin | 179/15 BY |
| 3,906,159 | 9/1975 | Lutz | 179/15 BS |
| 3,909,540 | 9/1975 | Maryscuk | 179/15 BY |
| 3,922,493 | 11/1975 | Brenig | 179/15 BY |

*Primary Examiner*—David L. Stewart
*Attorney, Agent, or Firm*—Haseltine, Lake & Waters

[57] ABSTRACT

PCM telephone transmission apparatus and particularly the use of several extra binary positions in a multiplex frame. These positions are used in one or several units auxiliary to the main unit which processes PCM telephone signals. The auxiliary unit(s) include(s) a signalling time base identical to the signalling time base of the main unit. The counting signals for this auxiliary time base are at a lower rate than the counting signals of the main unit, but they are applied in such a way that a part of the auxiliary time base counts at the same rate as the corresponding part of the time base in the main unit. This structure enables an evolutive use of the extra bits without modification of the main unit.

5 Claims, 4 Drawing Figures

DIGITAL TRAIN PROCESSING DEVICE

FIELD OF THE INVENTION

The invention relates to digital electronics and concerns a processing device for processing a digital signal consisting of a series of N-bit frames. The processing device has a main unit with an input and/or output for the entire frame and main processing means for N-n bits of each frame, the remaining n bits being at least partially processed in an auxiliary unit which may be in a separate equipment rack.

PRIOR ART

In digital equipment for multiplex transmission of thirty PCM telephone channels, a digital pulse train is constituted by a series of frames, each frame having 30 words whose digital values correspond to thirty amplitude samples taken from the thirty telephone channels together with other data such as e.g. telephone signalling or even data not related to the telephone channels, e.g. telegraph signals.

At the terminal of a connection of this type, it should be possible to separate the PCM telephone data from the other data.

Taking into consideration the quite particular character of this other data and the variety of uses to which it may be put, it is an advantage to separate the processors for this other data from the main PCM processing unit.

For a terminal of a digital connection, processing consists in extracting data from a pulse train with a view to using it and/or introducing data into the appropriate time slots of the pulse train with a view to transmitting it.

To maintain synchronization enabling the definition of the different bit positions within each frame, modulo N counters are used where N is the number of bits to a frame.

Assuming that $n$ is the number of bits of "other" data to be processed in an auxiliary unit, the counter of the main unit should transmit to the auxiliary unit signals marking the positions of the $n$ bits in the frame. This would lead to a cable between the two units having a large number of wires.

To remedy this drawback, an inherent time base could be constituted in the auxiliary unit by means of a new counter. However, this solution is not very versatile with respect to any modification of the number $n$ and in particular with respect to a structure having several units in cascade, for it would be necessary to provide different counters for each type of unit and each type of use.

SUMMARY OF THE INVENTION

The present invention aims at reducing the complexity of structure for this case.

The present invention provides a device for processing a main digital pulse train composed of a string of N-bit frames, the device comprising a main unit having an input and/or an output for the pulse train and a processor for processing N-n bits of each frame, at least some of the $n$ remaining bits being processed by an auxiliary processor in an auxiliary unit, the processor of the main unit being associated with a main modulo N counter which counts at the pulse rate of the main digital pulse train and whose state defines at any one instant the position of a current bit within a frame, the auxiliary unit including an auxiliary modulo N counter connected to receive counting signals from the main unit at a rate which is a sub-multiple $n/N$ of the main pulse rate in such a manner that a part of the auxiliary modulo N counter counts at the same rate as the corresponding part of the main modulo N counter.

Preferably, a synchronization signal is transmitted from the main unit to the auxiliary unit as a submultiple of the counting signal rate.

There may be several auxiliary units connected in cascade each one processing some of the $n$ data bits.

BRIEF DESCRIPTION OF THE DRAWINGS

Three embodiments of the invention are described by way of example with reference to the accompanying drawings in which.

DETAILED DESCRIPTION

Figure 1:
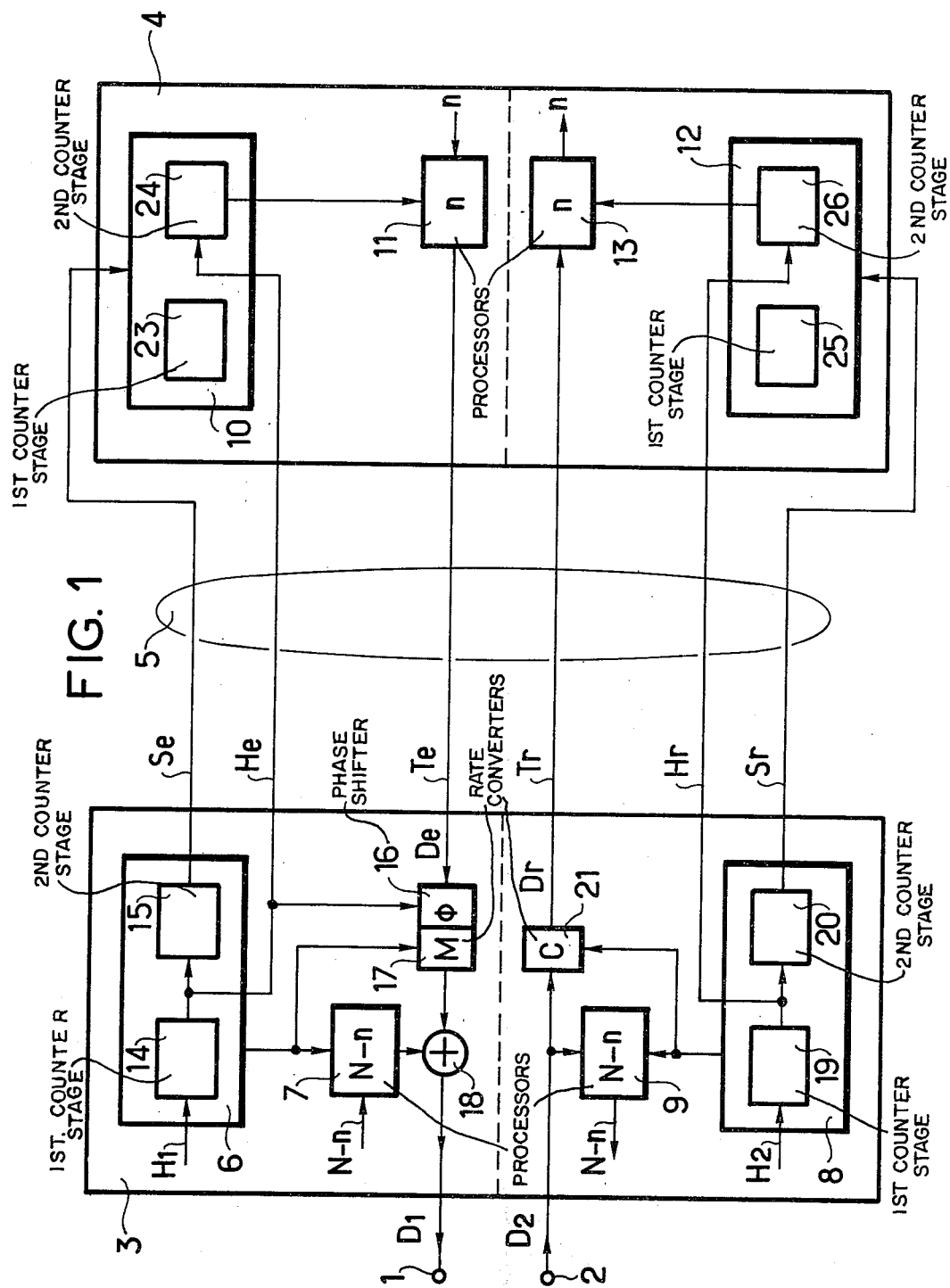
FIG. 1 is a block diagram of a first embodiment.

FIG. 1 is a block diagram of a PCM terminal for connection to a PCM transmission circuit. The terminal has an output 1 for connection to a transmit path of the transmission circuit and an input 2 for connection to a receive path.

The terminal comprises a main unit 3 and a auxiliary unit 4. The main unit 3 includes processors 7 and 9 for processing digital data corresponding to telephone calls. The processor 7 inserts data into the output pulse train at a bit rate D1 while the processor 9 reads data from the input pulse train at a bit rate D2.

The transmit processor 7 is controlled by a modulo N counter 6 made up of a modulo N/n counter 14 and a modulo n counter 15. Similarly, the receive processor 9 is controlled by a modulo N counter 8 made up of a modulo N/n counter 19 and a modulo n counter 20.

The transmit counter 6 is controlled by clock pulses H1 to generate output pulses at the rate D1 while the receive counter 8 is controlled by clock pulses H2 recovered from the transitions in the input pulse train at the rate D2. The clock pulse train frequencies H1 and H2 are identical (D1 = D2) but their phase relationship is arbitrary.

As outlined above some of the data in the input or output pulse trains is not directly related to the telephone speech paths ($n$ bits per N-bit frame). This data is processed in the auxiliary unit 4 which is connected to the main unit 3 by a cable 5. The non-telephone data sent by the auxiliary unit 4 to the main unit 3 at a rate De (where De = $D1 \cdot (n/N)$) is designated Te while the non-telephone data sent by the main unit 3 to the auxiliary unit 4 at a rate Dr (where $Dr = D2 \cdot (n/N)$) is designated Tr.

The transmission side of the main unit 3 is completed by a phase shifter 16 for adjusting the phase of the pulse train Te under the control of the counter 14 at a clock rate $He = H1 \cdot (n/N)$, a converter 17 for converting the rate De to the rate D1 and by an adder 18 whose output supplies the complete output pulse train at the rate D1 to the output 1. The reception side of the main unit 3 includes a converter 21 for converting the rate D2 to the rate Dr for data to be processed by the auxiliary unit 4.

The cable 5 conveys the following pulse trains from the main unit 3 to the auxiliary unit 4: the transmit clock pulses He for the transmit data Te; transmit frame synchronization pulses Se; receive clock pulses Hr for the receive data Tr; receive frame synchronization pulses Sr; and received "other" data, i.e. the n bits per frame which constitute the pulse train Tr and whch are extracted from the pulse train applied to the input 2 for processing by the auxiliary unit 4. In the reverse direction, i.e. from the auxiliary unit 4 to the main unit 3, the cable 5 conveys the pulse train Te for transferring the n bits formed in the auxiliary unit 4 to the main unit 3 for insertion into the pulse train applied to the output 1.

The clock pulses He and Hr together with the synchronization pulses Se and Sr are applied to respective transmit and receive counters 10 and 12 of the auxiliary unit 4.

The rate converters 17 and 21 together with buffer memories (not shown) enable the data transmission rate between the two units to be reduced to the submultiple n/N of the input and output data rates. Likewise, the clock pulses He and Hr conveyed from the main unit to the auxiliary unit 4 are at the lower rate. A first advantage of this lower rate is a reduction in the cable attenuation with the consequent result that the maximum useful length of the cable 5 without installing intermediate amplifiers is increased.

In a practical example, the input train or the output train is constituted by a series of frames, each frame having 256 bits (N = 256) or 30 telephonic samples having 8 bits each and 16 bits for synchronization and for other data, e.g. signalling data. The transmission rate $D_1$, $D_2$ is 2.048 Mbits/s. The transmission clock pulses He and the receiving clock pulses Hr which are conveyed by the cable 5 to the auxiliary unit 4 are then at a rate of 64 kHz, supposing it is required to process a maximum of 8 bits per frame (n = 8) in the auxiliary unit 4. The synchronization pulses can be provided at the beginning of each frame, i.e. at a rate of 8 kHz. In the precise case of a PCM multiplex in which the 8 bits processed by the auxiliary unit 4 during each frame relate to telephone channel signalling, the processed bits are organized within a multiframe of 16 consecutive frames so that signalling data can be transmitted in blocks of 128 bits. The Se or Sr synchronization pulses are then advantageously transmitted at the multiframe rate. The counters 6 and 8 (and consequently 10 and 12) then have a counting capacity of 256 × 16 bits provided by adding respective modulo 16 multiframe counters thereto (not shown). The transmission rate Se and Sr is then reduced to 8 kHz/16 = 500 Hz and indicates e.g. the beginning of each multiframe.

The number of different types of components is reduced by using the same type of counter for the auxiliary units' counters 10 and 12 as for the main units' modulo-N counters 6 and 8. The main units' counters 6 and 8 count at the rate of the input and output pulse trains, and a typical value for N in PCM telephone applications is N = 256. The difference in pulse rates between the clock pulse rate He or Hr applied to the auxiliary counters and the main unit counter rate H1 or H2 (where $He = (n/N) H1$ and $Hr = (n/N) H2$) is allowed for by applying the auxiliary clock pulses to intermediate stages of the counters 10 and 12. The operating frequency of the auxiliary unit 4 is thus adapted to match its data rate regardless of the position of its data bits within a frame.

Thus the counter 10 comprises a modulo n counter 24 which is operated on by the clock pulses He and the synchronization pulses Se, and a modulo N/n counter 23 which is idle. Likewise the counter 12 comprises a useful modulo n counter 26 and an idle modulo N/n counter 25. The auxiliary transmit modulo n counter 24 controls a processor 11 for processing its n bits while the auxiliary receive modulo n counter 26 controls a processor 13 for processing its n bits.

To facilitate access to intermediate stages of the modulo N counters 6, 8, 10 and 12, these counters are constituted by a string of divide-by-two bistables connected in cascade. Consider $N = 2^k$ and $n = 2^p$ where $k > p$; then in the PCM frame described above $k = 8$ ($N = 256$) and $p = 3$ ($n = 8$) and $k$ and $p$ are positive integers. If $n$ is such that $p$ is not a positive integer then $n$ must be increased to the next greater value which gives a positive integer for $p$, thereby enabling the same modulo N counters to be used in all the units. For example, in a case where $n = 10$, $p$ is roughly $3\frac{1}{3}$ and must therefore be increased to 4. The capacity of the pulse trains Te and Tr will then be raised to $2^4 = 16$ bits even though only 10 of these bits are used.

For this first embodiment of the invention, it is assumed that the length of the cable 5 is such that the propagation time of one bit along the cable is less than half of the bit period of the secondary digital train having n bits conveyed between the auxiliary unit 4 and the main unit 3.

It is also possible to provide for mixed use i.e. the processing of some of the n bits in a first auxiliary unit and the remaining bits in one or several other auxiliary units.

Figure 2:
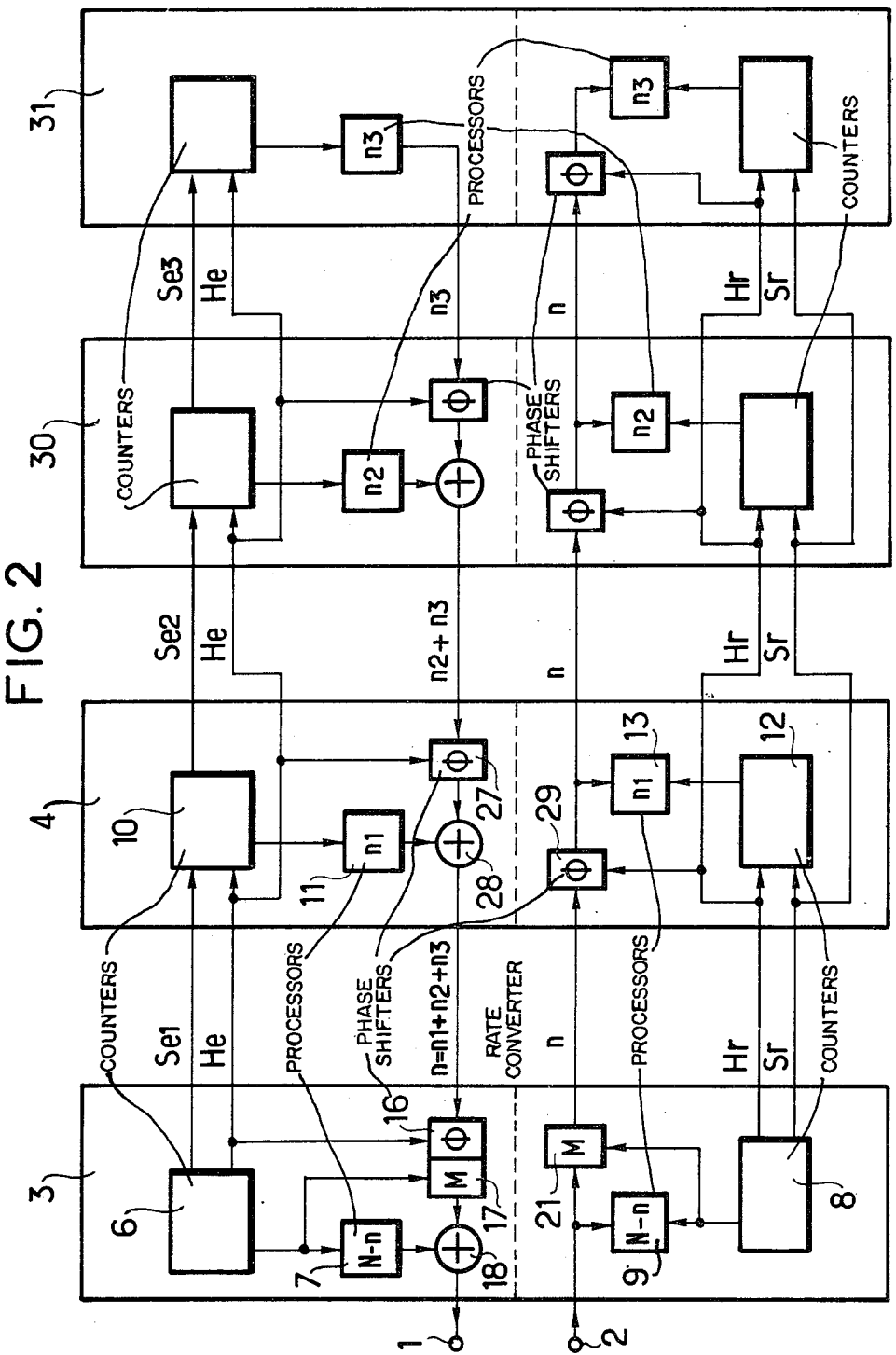
FIG. 2 is a block diagram of an embodiment having a plurality of auxiliary units.

FIG. 2 shows an embodiment corresponding to such mixed use; three auxiliary units 4, 30 and 31 are connected in cascade from a main unit 3. Each rack is specific for the processing of a few bits of the train, i.e. n1, n2, n3 bits respectively (n = n1 + n2 + n3) and transmits the remaining bits intended for any of the following units. Each unit has a counter of the same type as the counter 10 shown in FIG. 1. The length of the cables between the various units must be limited so that the delay of a signal which covers the distance between two units does not exceed half of one bit period of the n bit digital train which is progressively built up.

In this configuration, each auxiliary unit fulfills for the following unit the function which the main unit 3 in FIG. 1 fulfills for the auxiliary unit 4, with the difference that the auxiliary units do not have to perform the bit-rate conversions of the converters 17 and 23 of the main unit 3.

Figure 4:
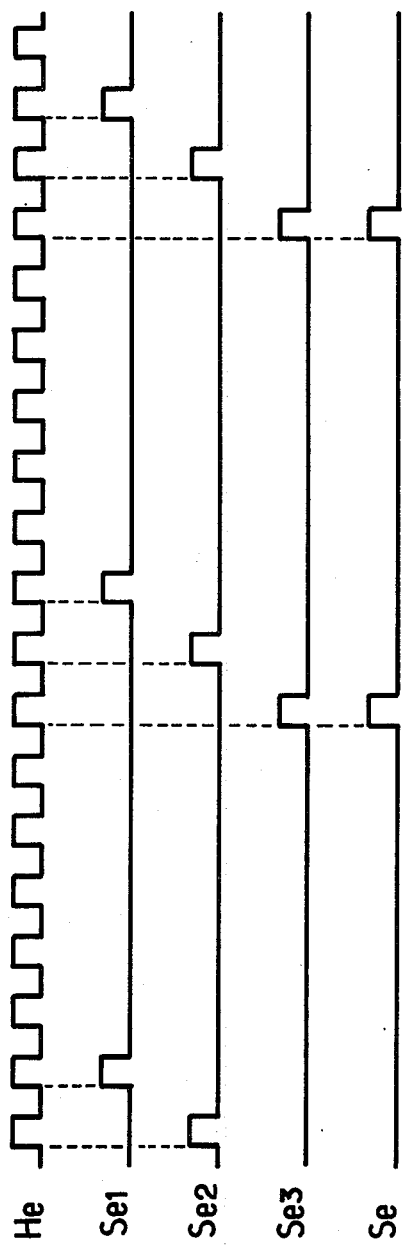
FIG. 4 is a waveform diagram showing the timing of synchronisation signals used in the embodiment of FIG. 2.

In order to take into account the delays corrected by the phase shifters as shown at 16 or 27 and to ensure, for example that the bits coming from the auxiliary unit 30 are inserted at the appropriate places in the train generated by the auxiliary unit 4, the synchronization pulse trains Se1, Se2 and Se3 have, in this version, been shifted by one bit period in relation to one another, Se2 being one bit period in advance of Se1 and Se3 being one bit period in advance of Se2. These shifts are shown in FIG. 4. The counters are each set to the same counting state by the synchronization pulses they receive.

Figure 3:
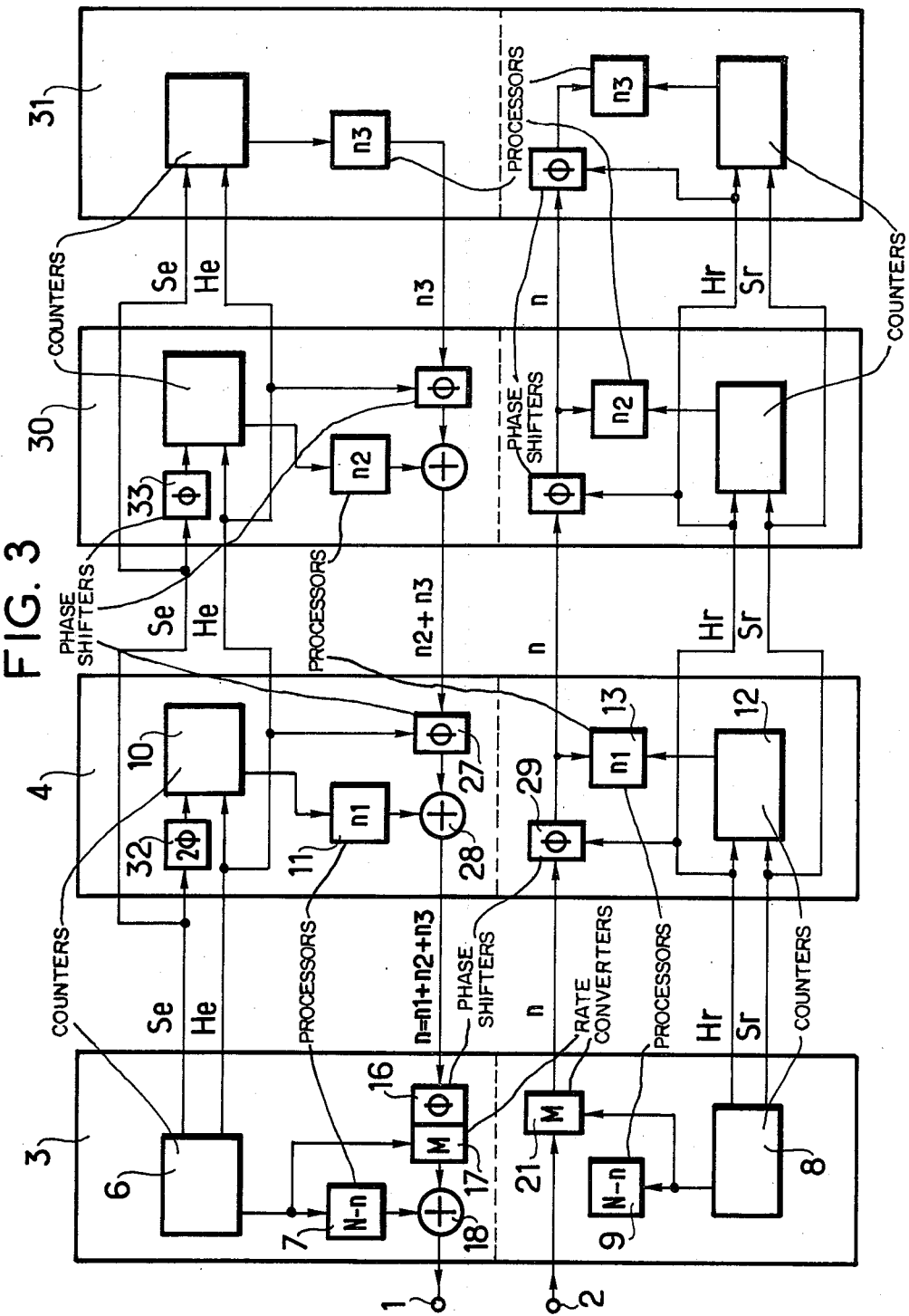
FIG. 3 is a block diagram of a second embodiment having a plurality of auxiliary units.

The structure shown in FIG. 3 and which constitutes a modified embodiment in relation to FIG. 2 also has a main unit 3 and three auxiliary units 4, 30 and 31 connected in cascade; the main difference in relation to the preceding embodiment is that the same synchronization signal Se is sent to all three auxiliary units. A phase shifter 32, 33 is inserted in the transmission part of the units 4 and 30 to delay the synchronization signal. In the last unit 31 of the cascade the synchronization signal is not subjected to any delay; in the last but one unit 30, it is delayed by one bit period (phase shifter 33) and in the first auxiliary unit 4, the synchronization signal is delayed by two bit periods (phase shifter 32). These synchronization delays cause the $n$ bits in the main unit 3 coming from the various auxiliary units to coincide.

The processing of the single synchronization signal $Se$, distributed to the auxiliary units aims at the same result as the processing of the three synchronization signals $Se1$, $Se2$, $Se3$ in FIG. 2, i.e. the correct timing of the insertion of bits coming from upstream units in the pulse train of each downstream unit.

What we claim is:

1. A device for processing a digital pulse train composed of N-bit frames, said device comprising a main unit, an auxiliary unit and a cable connecting both units, said main unit comprising a main processor for processing N-$n$ bits per frame and a modulo N counter, which counts at the bit rate of the train and which defines by its instantaneous state the position of a bit in the frame, said auxiliary unit comprising an auxiliary processor for processing at least some of the remaining bits of each frame and an auxiliary modulo N counter of the same type as the main counter, which receives via the cable a submultiple $n/N$ of the bit rate of the train, said submultiple being applied to an intermediate stage of the auxiliary counter such that part of this counter counts at the same rate as the corresponding part of the main counter, said auxiliary counter including means for synchronizing the operation of the auxiliary processor and the information exchange with the main unit via the cable.

2. A device according to claim 1, further comprising means for conveying a counter synchronization signal from the main counter to the auxiliary counter via the cable, the latter said signal having a pulse rate which is a submultiple of the counting rate of the auxiliary counter.

3. A device according to claim 2, in which several of said auxiliary units are provided, which are connected in cascade to the main unit, each processing only selected ones of the n bits.

4. A device according to claim 3, wherein the counter synchronization signals conveyed from the main unit to the adjacent auxiliary unit in the cascade, respectively from one auxiliary unit to the adjacent auxiliary unit are advanced for one bit period of the train with respect to the preceding unit.

5. A device according to claim 3 further comprising delay means disposed in front of respective auxiliary counters, said counter synchronization signal being conveyed from the main unit to the auxiliary unit via said delay means, said delay means having a delay period depending on the position of the respective unit in the cascade.

* * * * *